United States Patent [19]

Custro et al.

[11] Patent Number: 5,395,894
[45] Date of Patent: * Mar. 7, 1995

[54] BRANCHED BLOCK COPOLYMER, PROCEDURES FOR ITS PREPARATION AND USE

[75] Inventors: Sergio Custro, Ravenna; Alessandro Zazzetta, Cesena, Forli', Italy

[73] Assignee: Enichem Elastomeric s.r.l., Milan, Italy

[ * ] Notice: The portion of the term of this patent subsequent to Mar. 1, 2011 has been disclaimed.

[21] Appl. No.: 43,987

[22] Filed: Apr. 7, 1993

Related U.S. Application Data

[63] Continuation of Ser. No. 734,773, Jul. 23, 1991, abandoned.

[30] Foreign Application Priority Data

Jul. 25, 1990 [IT] Italy .................. 21041/90

[51] Int. Cl.$^6$ .................................... C08F 297/04
[52] U.S. Cl. ............................................. 525/314
[58] Field of Search ................................. 525/314

[56] References Cited

U.S. PATENT DOCUMENTS

| | | |
|---|---|---|
| 3,670,054 | 6/1972 | DeLaMare et al. . |
| 4,153,647 | 5/1979 | Glukhouskoi et al. ........... 525/314 |
| 4,248,984 | 2/1981 | Bi et al. .............. 525/314 |
| 4,291,139 | 9/1981 | Halasa et al. . |
| 4,417,029 | 11/1983 | Milkovich ............ 525/314 |
| 4,524,184 | 6/1985 | Murray ................. 525/71 |
| 4,874,821 | 10/1989 | Agostinis et al. . |
| 5,079,296 | 1/1992 | Thompson et al. ........... 525/71 |

FOREIGN PATENT DOCUMENTS

| | | |
|---|---|---|
| 0058952 | 9/1982 | European Pat. Off. . |
| 2061961 | 5/1981 | United Kingdom . |
| 2225330 | 5/1990 | United Kingdom . |

OTHER PUBLICATIONS

WPIL, 87-139969 & JP-A-62-079211, Apr. 11, 1987.

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

A branched block copolymer is described, which can be defined by the formula $(B_1\text{-}T\text{-}A\text{-}B_2)_n X$, where $B_1$ and $B_2$ are polydiene blocks, A is an aromatic polyvinyl block, T is a random copolymer segment made up of dienic monomeric and aromatic vinyl units, X is a coupling radical having a valence equal to n, and n is a whole number ranging from 3 to 20. This kind of block copolymer is used in formulations of adhesives having an excellent balance of adhesive, cohesive, rheological characteristics, as well as resistance to heat oxidation, and in compositions together with thermoplastic polymers capable of giving products with improved shock resistance and transparency.

10 Claims, No Drawings

BRANCHED BLOCK COPOLYMER, PROCEDURES FOR ITS PREPARATION AND USE

This is a continuation application of Ser. No. 07/734,773, filed on Jul. 23, 1991, now abandoned.

The present invention concerns a branched block copolymer, the procedure for its preparation and its use in the formulations of adhesives having an excellent balance of adhesive, cohesive and rheological characteristics as well as resistance to heat oxidation, and in compositions with thermoplastic polymers suitable for the production of manufactures with improved shock resistance and transparency.

The anionic polymerization of dienic and vinylaromatic monomers in the presence of metal alkyl or metal aryl catalysts, obtaining so-called "living polymers", is a well-known technique and is described by M. Schwarc in "Carbanions, Living Polymers and El. Transfer Processes", Interscience Publisher, J. Wiley and Sons, New York, 1956.

With this living polymer technique, in particular, it is possible to prepare both linear and branched block copolymers, especially block copolymers of polybutadiene and polystyrene, as, for example, those mentioned in the U.S. Pat. Nos. 3,078,254, 3,244,644, 3,265,765, 3,280,084, 3,594,452, 3,766,301 and 3,937,760.

These block copolymers are widely used, for example, in the field of adhesive, in compositions with various plastic materials, in the shoe industry, etc.

One serious problem with these block copolymers consists in the difficulty of providing a good balance between the rheological characteristics, the mechanical resistance and thermo-oxidation. For example, the well-known three-block copolymers A-B-A (polystyrene-polybutadiene-polystyrene) normally show high mechanical characteristics but poor thermo-oxidation resistance. In addition, their rather high viscosity, both in their molten state and in solution, creates problems in the processing and transformation. On the other hand, the four-block $(AB)_2$ linear copolymers, known in the art, containing all similar polybutadiene blocks, have generally good rheological but poor mechanical properties. Similar considerations go for multiblock $(AB)_n$ linear copolymers, where n is a whole number higher than 2 and can reach a value of about 10.

U.S. Pat. No. 4,874,821 describes a linear copolymer with four alternating blocks $B_1$-$A_1$-$B_2$-$A_2$, having definite proportions among the blocks, and also containing, between blocks $B_1$ and $A_1$ a copolymeric sequence formed by dienic and vinylaromatic monomeric units linked at random to each other. This kind of block copolymer is particularly suitable for use in adhesive formulations having good cohesion characteristics and thermo-oxidation stability.

According to the known technique, block copolymers are also used in compositions with thermoplastic polymers, to provide the manufactures with high shock-resistance characteristics. The main problems in this field consist in the poor workability of the mixtures between the thermoplastic polymer and the block copolymers and low transparency of the product obtained from these mixtures.

The applicant has now discovered and describes in the present invention, a special branched block copolymer having good overall rheological and mechanical characteristics, resistance to thermo-oxidation and transparency, useful in adhesive formulations and which, when mixed with thermoplastic polymers, produces shock-resistant manufactures with improved transparency.

In accordance with the above, the present invention concerns a branched block copolymer which can be defined with the formula:

$$(B_1\text{-}T\text{-}A\text{-}B_2)_n X \qquad (I)$$

where:
$B_1$ and $B_2$ are polydienic blocks;
A is a polyvinylaromatic block;
T is a random copolymeric segment formed by dienic and vinylaromatic monomeric units;
X is a coupling radical of valence n, and
n is a whole number between 3 and 20;
the above copolymer having a weight average molecular weight of between 60,000 and 500,000; an A block content from 20 to 80% by weight; a $B_1+B_2$ block content from 20 to 80% by weight; a weight ratio between blocks $B_1$ and $B_2$ from 0.1 to 1.0; and a T segment content from 0 to 40% by weight.

In the present invention, the preferable weight ratio in the block copolymer, between blocks $B_1$ and $B_2$ varies from 0.2 to 0.5, the copolymeric segment T varies from 5 to 40% by weight of the block copolymer and n is a whole number from 3 to 10.

It is most preferable in the block copolymer for block A to be a polybutadiene block, blocks $B_1$ and $B_2$ to be polystyrene blocks, segment T a random copolymer of butadiene and styrene units in quantities from 10 to 30% by weight in relation to the copolymer, n is the whole number 3 or 4 and X is chosen from between $=\text{Si}=$ and $CH_3Si\equiv$.

The branched block copolymer of the present invention is used in accordance with its composition. Copolymers having a low content of vinylaromatic monomer and a weight ratio between blocks $B_2$ and $B_1$ close to one, can be combined with oils and asphaltic resins to give adhesive formulations with good adhesion and cohesion characteristics. An example of an adhesive formulation is the hot-melt formulation. Moreover, copolymers with a high content of vinylaromatic monomer have excellent transparency to light as well as a high shock-resistance. These copolymers can either be used on their own or in mixtures with common thermoplastic polymers to produce manufactures with improved shock-resistance and transparency. Suitable thermoplastic polymers are polyolefin such as polyethylene and polypropylene, and particularly polystyrene. The manufactures can be used in the packaging industry, especially for food.

The present invention also includes procedures for the preparation of the branched block copolymer (I).

More specifically, when the copolymeric sequence T is present in the block copolymer (I), the procedure for its preparation includes the following steps carried out in succession:

(a) Polymerization, using the living polymer technique, of specific quantities of diolefine and vinylaromatic monomer mixed together until the complete, or almost complete, conversion of the monomers is reached. The formation of a living copolymer of the $B_1$-T-A type is thus obtained.

(b) Addition of a specific amount of a diene monomer to the copolymer obtained in step (a) and polymerization until complete, or almost complete, conversion of the added diene monomer. The formation of a living copolymer of the $B_1$-T-A-$B_2$ type is thus obtained.

(c) Coupling of the living polymeric chains obtained in step (b) using a polyfunctional coupling agent. The formation of the branched block copolymer (I), having in its chain the copolymeric T segment, is thus obtained.

(d) Recovery of the branched block copolymer (I) containing the segment T.

Using the procedure described above, it is possible to vary the composition and length of the copolymeric segment T by adding polar products, such as ethers and amines, to the reaction system, in the first polymerization step (a).

When the copolymeric sequence T is not present in the block copolymer (I), the procedure for its preparation includes the following steps in succession:

(a) Polymerization, using the living polymer technique, of a measured quantity of diolefine until the complete, or almost complete, conversion of the fed polyolefin. The formation of living block $B_1$ is thus obtained.

(b) Addition of a measured amount of vinylaromatic monomer to the polymer obtained in step (a) and polymerization until the complete, or almost complete, conversion of the fed vinylaromatic monomer. The formation of a living copolymer of the $B_1$-A type is thus obtained.

(c) Addition of a measured quantity of diolefin to the copolymer obtained in step (b) and polymerization until the complete, or almost complete, conversion of the fed diolefin. The formation of a living copolymer of the $B_1$-A-$B_2$ type is thus obtained.

(d) Coupling of the living polymeric chains obtained in step (c) using a polyfunctional coupling agent. The formation of the branched block copolymer (I), without the copolymeric T segment in its chain, is thus obtained.

(e) Recovery of the branched block copolymer (I) without the segment T.

In particular, the polymerization steps are carried out in an aliphatic or cycloaliphatic organic solvent, at temperatures ranging from 30° to 150° C., at a pressure equal to, or higher than the atmospheric value, in the presence of metal alkyl or metal aryl catalysts. Preferably the solvent should be n-hexane or cyclohexane, the reaction temperature should range from 50 to 100° C. and the catalyst should be alkyl lithium whose alkyl radical contains from 3 to 7 carbon atoms, and said catalyst should be used in amounts from 0.025 to 0.20 parts by weight every 100 parts of the total monomers. In the polymerization mixture, polar compounds such as ethers and amines can be present at a maximum concentration of approx. 0.1% by weight with respect to the solvent.

In the coupling phase, it is preferable to work at a temperature ranging from 110° to 125° C. in the presence of a coupling agent chosen among the esters of aliphatic and aromatic bicarboxylic acids, halogen derivatives of aliphatic or aromatic hydrocarbons, the chlorine derivatives of aliphatic or aromatic silanes, arenes containing unsaturated hydrocarbon radicals and the tri or tetra-chlorine derivatives of silicon, tin or germanium.

For the practical use it is preferable for the coupling agent to be either silicon tetrachloride or $CH_3SiCl_3$. It is also preferable for the diolefin to be butadiene and the vinylaromatic monomer to be styrene.

After the coupling phase, the branched block copolymer can be recovered from the reaction mixture using the conventional techniques such as evaporation of the solvent in a vapor stream and subsequent drying of the separated copolymer.

The experimental examples which follow are intended to give a more detailed illustration of the present invention.

EXAMPLE 1

600 g of anhydrous cyclohexane and 15 g of butadiene are charged into a 1 liter reactor under stirring. The temperature of the mixture is brought to 50° C. and 0.102 g of sec-butyllithium in a n-hexane solution are then added. After 30 minutes of reaction the mass temperature reaches 60° C. and the conversion of butadiene is almost complete. 75 g of styrene are then added and after 15 minutes of reaction the temperature of the mixture reaches 78° C. and the conversion of styrene is almost complete. 10 g of butadiene are added. After 10 minutes of reaction the temperature of the mixture reaches 85° C. and the conversion of butadiene is almost complete. 0.075 g of silicon tetrachloride, in a solution of cyclohexane, are finally added and after 5 minutes the coupling reaction of the living chains is practically complete (98% yield).

10 g of triphenyl-nonylphosphite and 0.2 g of pentaerythritol tetrakis (3,3-di-ter-butyl-4-hydroxy-hydrocinnamate) are added to the above polymer solution. The recovery of the polymer is carried out by vapor flow distillation of the solvent and subsequent drying in an oven at 60° C. for 24 hours.

A block copolymer of the $(B_1$-A-$B_2)_nX$ type is thus obtained, where $B_1$ and $B_2$ are butadiene blocks, A is the styrene block, X=Si and n=4, with the following characteristics:

| | |
|---|---|
| $Mw.10^{-3}$ | 260 |
| (weight average molecular weight obtained by GPC analysis) | |
| Total styrene % | 75 |
| (by weight on the total styrene calculated by IR analysis) | |
| Styrene % in the blocks | 75 |
| (styrene % by weight in the blocks calculated by demolition by means of $OsO_4$) | |
| MFI (g/10'): | 4 |
| (Melt Flow Index calculated at 200° C. and 5 Kg) | |

The mechanical and optical characteristics of the tests samples obtained by pressure moulding of the block copolymer at 180° C. are the following:

| | |
|---|---|
| transparency (%): | 92 |
| ultimate tensile stress ($KJ/cm^2$) | 240 |
| ultimate elongation (%) | 15 |
| modulus ($kg/cm^2$) | 9000 |
| Izod notched bar test | 3.5 |
| (25° C.; kg · cm/cm) | |
| M.F.I. (g/10' min) | 9.5 |

EXAMPLE 2

6 kg of anhydrous cyclohexane, 250 g of butadiene and 700 g of styrene are charged into a 10 liter steel reaction vessel. The temperature of the mixture is brought to 50° C. by means of hot water circulation in the Jacket of the vessel and 0.79 g of sec-butyllithium in a n-hexane solution are then added.

After 25 minutes of reaction, the temperature of the mixture reaches 80° C. and the conversion of the monomers is almost complete. 50 g of butadiene are subsequently added and after 10 minutes of reaction the temperature of the mixture reaches 95° C. and the conversion of the butadiene is almost complete. Finally 0.65 g of silicon tetrachloride in a solution of cyclohexane are added and after 5 minutes the coupling reaction of the living chains is practically complete (99.9% yield).

Using the same procedure as in example 1, a block copolymer of the $(B_1$-T-A-$B_2)_nX$ type is recovered, where $B_1$ and $B_2$ are butadiene blocks, A is the styrene block, segment T is a random copolymer of diene and styrene units in amounts equal to 4% by weight with respect to the copolymer, X=Si and n=4, having the following characteristics:

| | |
|---|---|
| Mw.$10^{-3}$ | 250 |
| Total styrene % | 70 |
| Styrene % in the blocks | 50 |
| MFI (g/10') | 5 |

4 kg of the block copolymer obtained as described above, are mixed with 4 kg of commercial polystyrene crystal having a Mw (by GPC)=$250 \times 10^3$. The mass is charged into a twin-screw extruder equipped with a heated jacket and the process is repeated twice to give a thorough mixture. The material is then reduced to chips having an average diameter of 0.5 cm. The mechanical and optical characteristics of the test samples obtained by pressure moulding of the chips, at an operating temperature of 180° C., are the following:

| | |
|---|---|
| transparency (%): | 93 |
| ultimate tensile stress (KJ/cm$^2$) | 180 |
| ultimate elongation (%) | 70 |
| modulus (kg/cm$^2$) | 10,500 |
| Izod notched bar test (25° C.; kg · cm/cm) | 3.6 |
| M.F.I. (g/10') | 70 |

EXAMPLE 3

600 g of anhydrous cyclohexane, 8 g of butadiene and 46 g of styrene are charged into a 1 liter reaction vessel. The temperature of the mixture is brought to 50° C. and 0.18 g of sec-butyllithium (2.6 .$10^{-3}$ moles) in a n-hexane solution are then added.

After 25 minutes of reaction, the temperature of the mixture reaches 60° C. and the conversion of the monomers is almost complete. 46 g of butadiene are subsequently added and after 10 minutes of reaction the temperature of the mixture reaches 80° C. and the conversion of the butadiene is almost complete. Finally 0.15 g of CH$_3$SiCl$_3$ in a solution of cyclohexane are added and after 5 minutes the coupling reaction of the living chains is practically complete (97% yield).

Using the same procedure as in example 1, a block copolymer of the $(B_1$-T-A-$B_2)_nX$ type is recovered, where $B_1$ and $B_2$ are butadiene blocks, A is the styrene block, segment T is a random copolymer of butadiene and styrene units in amounts equal to 5% by weight with respect to the copolymer, X=CH$_3$Si and n=3, having the following characteristics:

| | |
|---|---|
| Mw.$10^{-3}$ | 100 |
| Total styrene | 46 |
| Styrene % in the blocks | 41 |
| MFI (g/10'): | 11 |

The block copolymer obtained as described above is transformed into a composition for hot melt containing:

| Component | Parts by weight |
|---|---|
| Block copolymer | 100 |
| ECR 140 A$^{(1)}$ liquid resin | 20 |
| Zonatac 501 Lite$^{(2)}$ adhesion agent | 140 |
| Shellflex 371 oil$^{(3)}$ | 25 |
| Irganox 1076$^{(4)}$ antioxidant | 1 |
| Polygard$^{(5)}$ antioxidant | 0.5 |

$^{(1)}$ = aliphatic hydrocarbon resin, produced commercially by Exxon
$^{(2)}$ = modified terpene type adhesion agent, produced commercially by Arizona
$^{(3)}$ = naphthene type oil, produced commercially by Shell
$^{(4)}$ = phenolic type antioxidant, produced commercially by Ciba Geigy
$^{(5)}$ = phosphate type antioxidant, produced commercially by Naugatuck.

The following adhesion characteristics are determined on the above formulation:

| | |
|---|---|
| Polyken tack (g; ASTM 2979) | 230 |
| Loop tack (g/2.5 cm; PSTC 5) | 230 |
| Peeling (g/2.5 cm; PSTC 1) | 2.000 |
| Holding power (g/2.5 cm; PSTC 7) | 35 |

(PSTC = Pressure Sensitive Testing Council).

The following thermo-oxidation characteristics are also determined on the above formulation.

| Period (days) | Brookfield viscosity; cps, 180° C. |
|---|---|
| 0 | 12,500 |
| 2 | 18,500 |
| 4 | 23,000 |
| 6 | 26,000 |

EXAMPLE 4

3 liters of anhydrous cyclohexane containing 0.03 g of tetrahydrofurane, 100 g of butadiene and 500 g of styrene are charged into a 5 liter stirred steel reactor. The temperature of the mixture is brought to 50° C. and 2.0 g of n-butyllithium in a n-hexane solution are then added.

After 25 minutes of reaction, the temperature of the mixture reaches 65° C. and the conversion of the monomers is almost complete. 400 g of butadiene are subsequently added and after 10 minutes of reaction the temperature of the mixture reaches 95° C. and the conversion of the butadiene is almost complete. Finally 1.31 g of silicon tetrachloride in a solution of cyclohexane are added and after 5 minutes the coupling reaction of the living chains is practically complete (98% yield).

Using the same procedure as in example 1, a block copolymer of the $(B_1$-T-A-$B_2)_nX$ type is recovered, where $B_1$ and $B_2$ are butadiene blocks, A is the styrene block, segment T is a random copolymer of diene and styrene units in amounts equal to 18% by weight with respect to the copolymer, X=Si and n=4, having the following characteristics:

| | |
|---|---|
| Mw.$10^{-3}$ | 145 |
| Total styrene % | 50 |
| Styrene % in the blocks | 40 |
| MFI (g/10'): | 12 |

1 kg of the block copolymer obtained as described above is mixed with 3 kg of commercial polystyrene crystal having a Mw (by GPC)=$250.10^3$ and with 2 kg of high density polyethylene (HDPE). The mixing is carried out in a Banbury machine at 200° C. in 3 minute cycles. The mechanical characteristics of the test samples obtained by the injection moulding of the mixture, at a temperature of 195° C., are the following:

| | |
|---|---|
| ultimate tensile stress (N/mm$^2$) | 20 |
| ultimate elongation (%) | 60 |
| module (N/mm$^2$) | 1500 |
| Izod notched bar test (J/m) | 350 |

We claim:

1. An adhesive composition comprising: an aliphatic hydrocarbon resin and a branched block copolymer of the formula:

$$(B_1\text{-}T\text{-}A\text{-}B_2)_n X \qquad (I)$$

where:
- $B_1$ and $B_2$ are polydienic blocks;
- A is a polyvinylaromatic block;
- T is a random copolymeric segment formed by dienic and vinylaromatic monomeric units;
- X is a coupling radical of valence n, and
- n is a whole number between 3 and 20;

the above copolymer having a weight average molecular weight of between 60,000 and 500,000; an A block content from 20 to 80% by weight; a $B_1+B_2$ block content from 20 to 80% by weight; a weight ratio between blocks $B_1$ and $B_2$ from 0.1 to 1.0; and a T segment content from 4 to 40% by weight.

2. The adhesive according to claim 1, wherein the weight ratio between block $B_1$ and Block $B_2$ ranges from 0.5 to about 1.0; the copolymeric block T ranges from 5 to 40% by weight of the total block copolymer; and n is a whole number from 3 to 10.

3. The adhesive according to claim 1, wherein the copolymeric block T varies from 10 to 30% by weight of the total block copolymer and n is the whole number 3 or 4.

4. The adhesive of claim 1, wherein block A is a polystyrene block, blocks $B_1$ and $B_2$ are polybutadiene blocks, segment T is a random copolymer of butadiene and styrene units and X is =Si= or CH$_3$Si≡.

5. The adhesive of claim 1, wherein said branched block copolymer is prepared by:

(a) alkyllithium catalyzed polymerization of diolefin and vinylaromatic monomer, mixed together in an aliphatic or cycloaliphatic solvent, until the complete, or almost complete, polymerization of the monomers is reached thus obtaining a living copolymer of the formula $B_1$-T-A, where T is a random copolymer segment of dienic and vinylaromatic units, $B_1$ is a polydiene block and A is polyvinylaromatic block, (b) adding a diolefin monomer to the copolymer obtained in step (a) and polymerizing until complete, or almost complete, conversion of the added diolefin monomer to obtain a living copolymer of the formula $B_1$-T-A-$B_2$, where $B_1$, T and A are as defined above and $B_2$ is a polydiene block, (c) coupling of anionic polymeric chains obtained in step (b) with a polyfunctional coupling agent to obtain a branched block copolymer of the formula $(B_1\text{-}T\text{-}A\text{-}B_2)_n X$, where $B_1$, T, A, $B_2$, X and n are as defined above, (d) recovering the branched block copolymer obtained by the coupling reaction of step (c).

6. The adhesive according to claim 5, wherein the polymerization steps are carried out using an aliphatic or cycloaliphatic organic solvent at a temperature ranging from 30° to 150° C. and at a pressure equal to or higher than the atmospheric value.

7. The adhesive according to claim 6, wherein the solvent is n-hexane or cyclohexane, the reaction temperature ranges from 50° to 100° C., the catalyst is alkyllithium whose alkyl radical contains from 3 to 7 carbon atoms, and said catalyst is used in quantities ranging from 0.025 to 0.20 parts by weight for every 100 parts of the total monomers.

8. Adhesive according to claim 5, wherein the coupling step is carried out at a temperature ranging from 110° to 125° C. in the presence of a coupling agent selected from the group consisting of esters of aliphatic bicarboxylic acids, esters of aromatic bicarboxylic acids, halogen derivatives of aliphatic hydrocarbons, halogen derivatives of aromatic hydrocarbons, chlorine derivatives of aliphatic silanes, chlorine derivatives of aromatic silanes, arenes containing unsaturated hydrocarbon radicals, trichloro derivatives of silicon, trichloro derivatives of tin, trichloro derivatives of germanium, tetrachlorosilane, tetrachlorotin and tetrachlorogermanium.

9. The adhesive according to claim 5, wherein the diolefin is butadiene and the vinylaromatic monomer is styrene.

10. The adhesive composition of claim 1 further comprising a naphthene oil and an antidioxant.

* * * * *

UNITED STATES PATENT AND TRADEMARK OFFICE
CERTIFICATE OF CORRECTION

PATENT NO.   : 5,395,894
DATED        : March 7, 1995
INVENTOR(S)  : Sergio CUSTRO, et al.

It is certified that error appears in the above-indentified patent and that said Letters Patent is hereby corrected as shown below:

On the title page, Item [73], the Assignee is listed incorrectly. It should read:

--Enichem Elastomeri s.r.l., Milan, Italy--

Signed and Sealed this

Thirtieth Day of May, 1995

*Attest:*

BRUCE LEHMAN

*Attesting Officer*        *Commissioner of Patents and Trademarks*